United States Patent [19]

Tsujiuchi et al.

[11] Patent Number: 5,121,445
[45] Date of Patent: Jun. 9, 1992

[54] METHOD AND APPARATUS FOR READING IMAGE

[75] Inventors: Junpei Tsujiuchi; Nagaaki Ohyama, both of Kanagawa; Seiichiro Hiratsuka, Tokyo; Toshio Honda, Kanagawa, all of Japan

[73] Assignee: Konica Corporation, Tokyo, Japan

[21] Appl. No.: 724,469

[22] Filed: Jun. 27, 1991

Related U.S. Application Data

[63] Continuation of Ser. No. 195,442, May 13, 1988, abandoned, which is a continuation-in-part of Ser. No. 69,005, Jul. 1, 1987, abandoned.

[30] Foreign Application Priority Data

| Jul. 1, 1986 | [JP] | Japan | 61-154896 |
| Sep. 23, 1986 | [JP] | Japan | 61-224300 |
| Sep. 23, 1986 | [JP] | Japan | 61-224301 |
| Sep. 23, 1986 | [JP] | Japan | 61-224302 |
| Sep. 23, 1986 | [JP] | Japan | 61-224303 |
| Sep. 23, 1986 | [JP] | Japan | 61-224304 |
| May 13, 1987 | [JP] | Japan | 62-117641 |

[51] Int. Cl.⁵ ............................. G06K 9/36
[52] U.S. Cl. ............................. 382/43; 358/408; 358/454; 382/62
[58] Field of Search ............. 382/43, 56, 58, 62, 382/63, 65; 358/454, 408, 409; 364/826, 827, 725, 726

[56] References Cited

U.S. PATENT DOCUMENTS

| 3,775,559 | 11/1973 | Vieri | 358/484 |
| 4,336,558 | 6/1982 | Lew | 358/454 |
| 4,358,794 | 11/1982 | Kurakami et al. | 358/408 |
| 4,553,221 | 11/1985 | Hyatt | 364/724.04 |
| 4,616,266 | 10/1986 | Hennig | 358/454 |
| 4,809,341 | 2/1989 | Matsui et al. | 382/20 |
| 4,893,195 | 1/1990 | Tada et al. | 358/454 |
| 4,941,194 | 7/1990 | Shimura | 382/56 |

FOREIGN PATENT DOCUMENTS 2170373A 7/1986 United Kingdom .............. 358/454

OTHER PUBLICATIONS

White, "Reduced Moire-Effect Change Coupled Device" *IBM Tech Disc. Bulletin*, vol. 20, #9, Feb. 1978, pp. 3752-3755.

Primary Examiner—Joseph Mancuso
Attorney, Agent, or Firm—Finnegan, Henderson, Farabow, Garrett, & Dunner

[57] ABSTRACT

A method of reading image wherein an original image is read with two different sampling intervals, and undesirable signal components are removed from the read image signals. An apparatus for reading image wherein an original image is read with different sampling intervals by reading devices of two systems; outputs of the reading devices are A/D converted and subjected to an orthogonal function transformation; a converted signal of smaller absolute value is subjected to an inverse orthogonal function transformation to produce a read image signal.

12 Claims, 14 Drawing Sheets

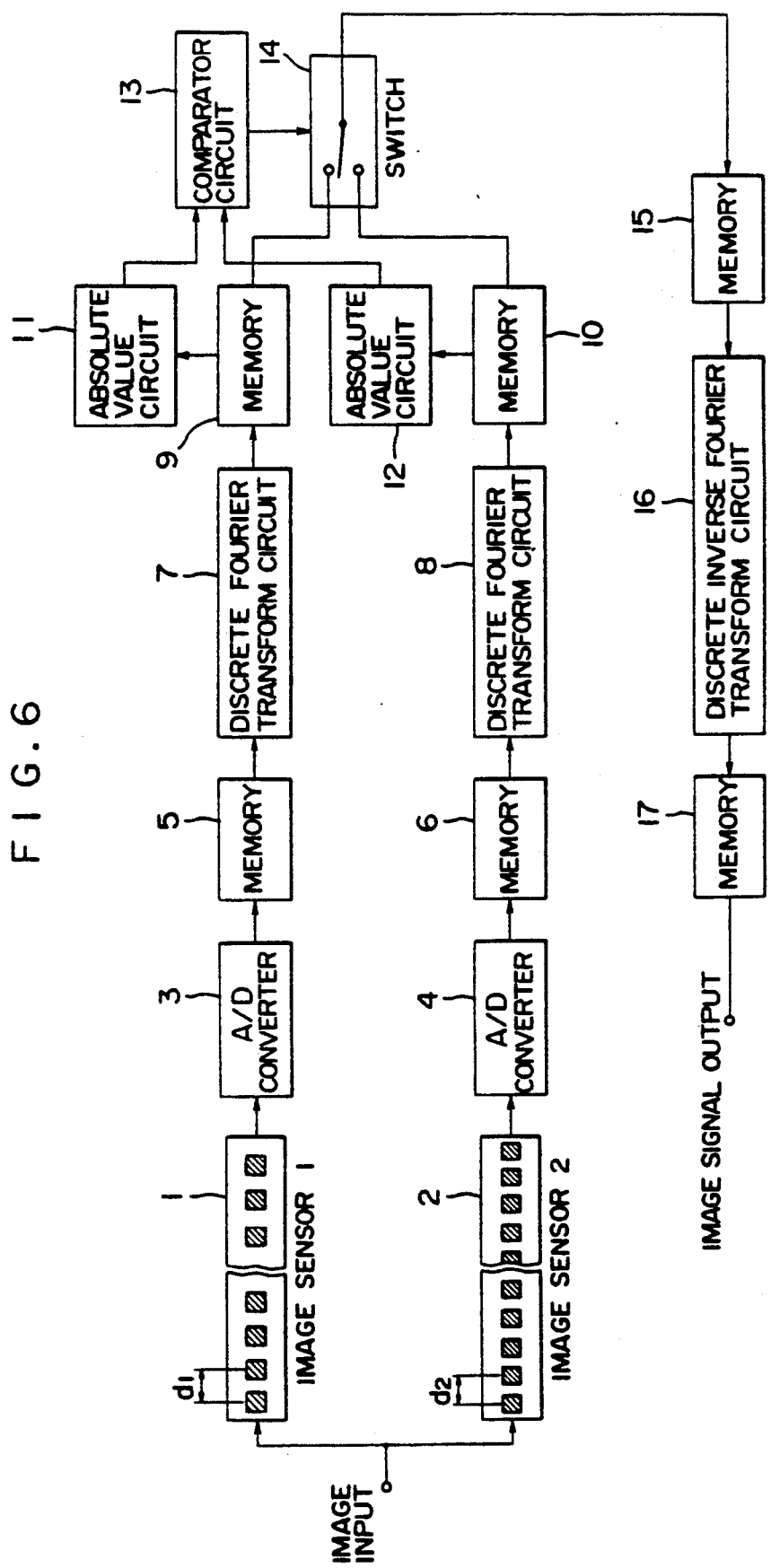
F I G. 6

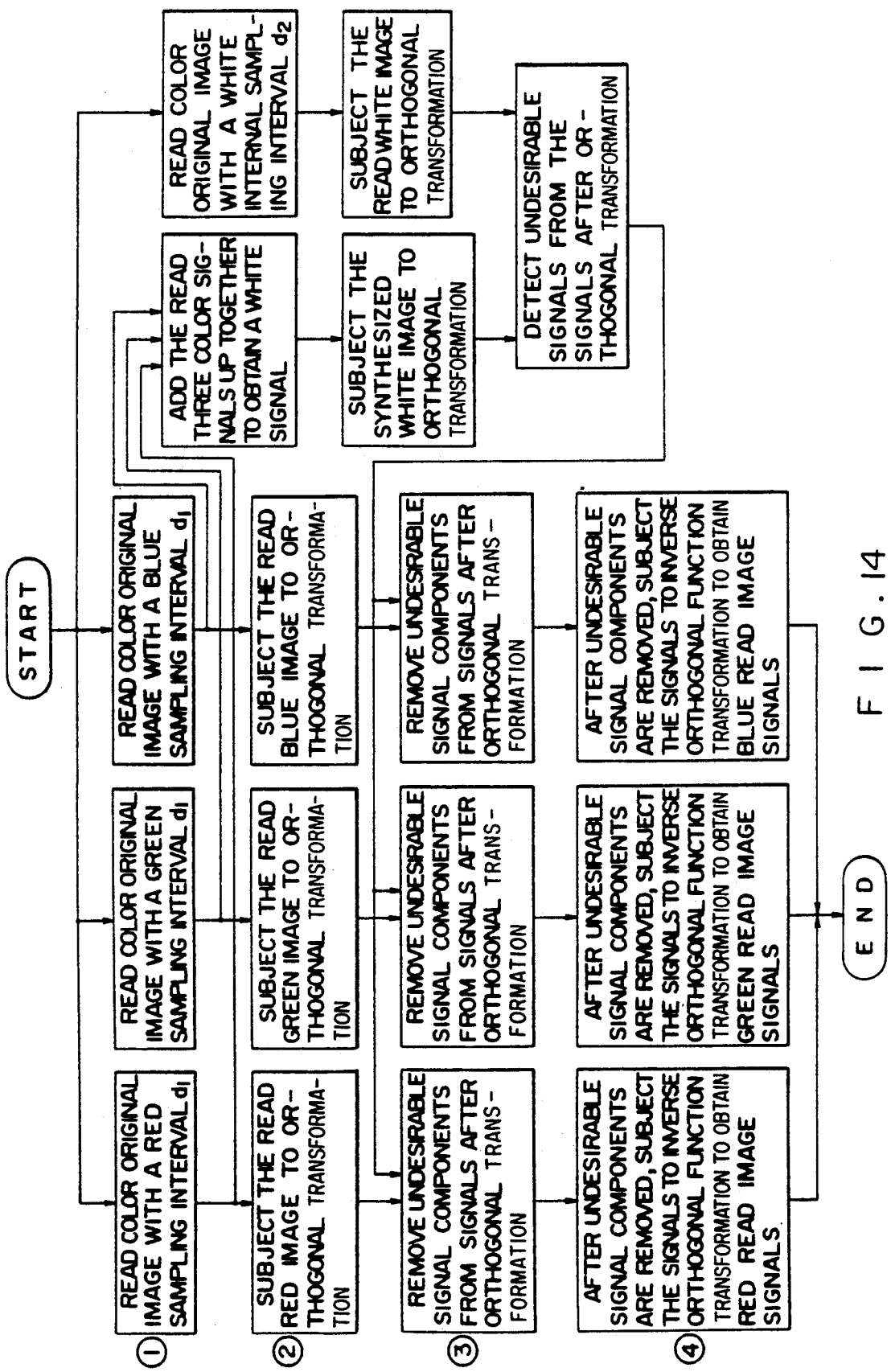

F I G. 15 A
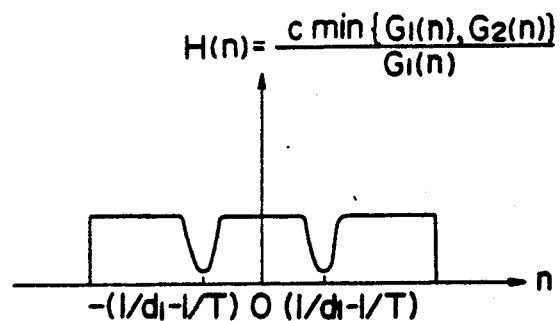
F I G. 15 B
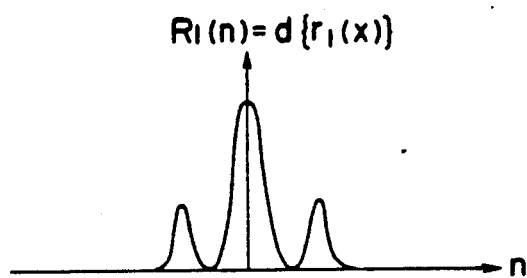
F I G. 15 C
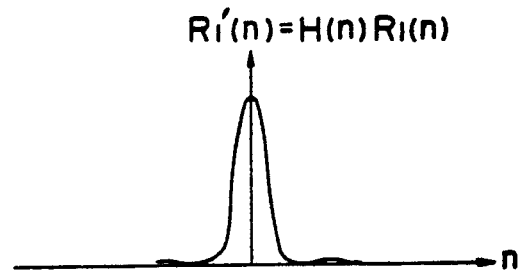
F I G. 15 D
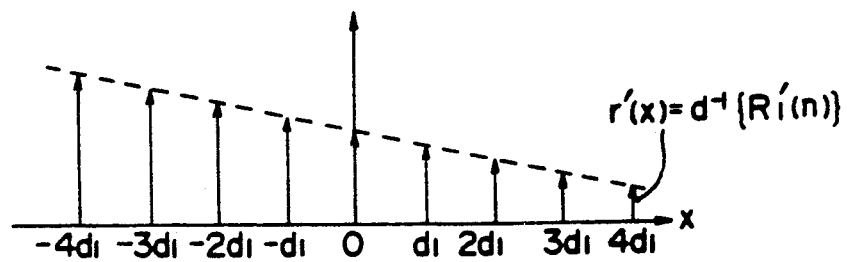

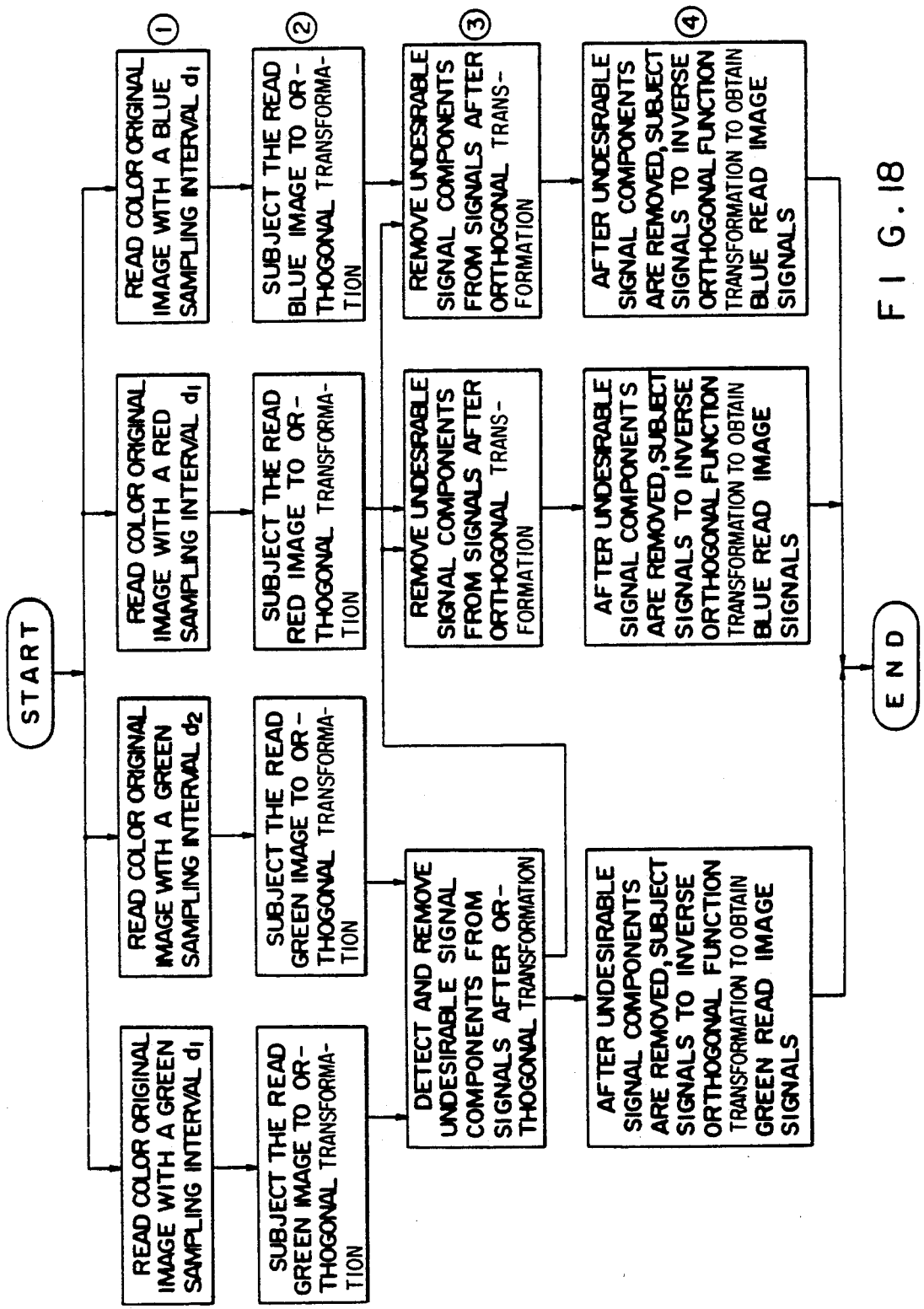

METHOD AND APPARATUS FOR READING IMAGE

CROSS-REFERENCE TO RELATED APPLICATION

This application is a continuation of application Ser. No. 195,442, filed May 13, 1988, which is continuation-in-part application Ser. No. 069,005 filed Jul. 1, 1987, both now abandoned.

BACKGROUND OF THE INVENTION

1. Field of the Invention

The present invention relates to a method and an apparatus for reading mono-chromatic image or color image. More specifically, the invention relates to a method and an apparatus for reading mono-chromatic image or color image preventing moire from developing.

2. Description of the Prior Art

In facsimile and digital reproducing machines, a line image sensor consisting of a plurality of photoelectric converter elements are used as an image reading apparatus for reading original image. Furthermore, image reading apparatus for reading color original image use plurality of line image sensors which are comprised of a plurality of photoelectric converter elements and which have different spectral sensitivities. When a halftone dot photograph of a color-printed matter among the originals, which is usually used in an office, is read by the line image sensor, a fringe pattern (moire) that does not exist in the original image often appears in the output signals. When the original image is that of a halftone dot photograph, it is known that moire is generated when a distance among halftone dot is close to the sampling interval of the image sensor. In order to suppress the generation of moire, therefore, attempts have been made to remove halftone dot frequencies using, for example, a low-pass filter.

When the smoothing is effected by using the low pass filter, however, the edges are blurred and the resolving power decreases.

SUMMARY OF THE INVENTION

The object of the present invention is to obtain a method and an apparatus for reading mono-chromatic image or color image, which make it possible to remove moire without deteriorating the resolving power.

The method of the present invention which solves the above-mentioned problem comprises reading an original image with at least two different sampling intervals, and using the thus read signals from which undesirable signal components have been removed as read image signals.

The apparatus of the present invention comprises reading means of at least two system for reading an original image with different sampling intervals; A/D converters which convert outputs of the reading means into digital data, respectively; transformation means which subject outputs of the A/D converters to an orthogonal function transformation; comparator means which compares absolute values for each component of the orthogonal function transformation means and which produces a smaller one as an output signal; and inverse transverse means which subjects the output of the comparator means to an inverse orthogonal function transformation to produce a read image signal.

Another method of the present invention comprises reading an original image using at least two neighboring reading devices with different sampling intervals, and using the read signals from which undesirable signal components have been removed as read image signals.

Another apparatus of the present invention comprises:

Another apparatus of the present invention comprises reading means of at least two systems that are adjacent to each other to read an original image with different sampling intervals; A/D converters which convert outputs of the reading means into digital data, respectively; transformation means which subject outputs of the A/D converters to the orthogonal function transformation; comparator means which compares absolute values for each component of an orthogonal function transformation means and which produces a smaller one as an output signal; and inverse transformation means which subjects the output of the comparator means to an inverse orthogonal function transformation to produce a read image signal.

A further method of the present invention comprises reading an original image with at least two different sampling intervals using intimately contacted-type reading means, and using the thus read signals from which undesirable signal components have been removed as read image signals.

A further apparatus of the present invention comprises intimately contacted-type reading means of at least two systems for reading an original image with different sampling intervals; A/D converters which convert outputs of the reading means into digital data, respectively; transformation means which subject outputs of the A/D converters to an orthogonal function transformation; comparator means which compares absolute values for each component of the orthogonal function transformation means and which produces a smaller one as an output signal; and inverse transformation means which subjects the output of the comparator means to an inverse orthogonal function transformation to produce a read image signal.

A still further method of the present invention comprises reading an original image with at least two different spectral sensitivities and two different sampling intervals, and using the thus read signals from which undesirable signal components have been removed as read image signals.

A still further apparatus of the present invention comprises reading means of at least two systems for reading a color original image with different spectral sensitivities and different sampling intervals; A/D converters which convert outputs of the reading means into digital data, respectively; transformation means which subject outputs of the A/D converters to an orthogonal function transformation; comparator means which compares absolute values for each component of the orthogonal function transformation means and which produces a smaller one as an output signal; and inverse transformation means which subjects the output of said comparator means to an inverse orthogonal function transformation to produce a color read image signal.

A yet further method of the present invention comprises reading a color original image using at least two or more first reading means which have different spectral sensitivities and a sampling interval and second reading means which has spectral sensitivity over the whole visible range and which has a sampling interval different from that of said first reading means, and using the thus read signals from which undesirable signal components have been removed as read image signals.

A yet further apparatus of the present invention comprises first reading means of at least two systems for reading the color original image with different spectral sensitivities and with the same sampling interval; second reading means of at least one system which has spectral sensitivity over the whole visible range and which reads the color original image with a sampling interval different from that of the first reading means; A/D converters which converts outputs of the first and second reading means into digital data, respectively; an adder for adding up the outputs of the first reading means; transformation means which subject outputs of the A/D converter to an orthogonal function transformation; means for obtaining signals that correspond to a moire-removing space frequency filter from the outputs of the orthogonal function transformation means that receives outputs from the second reading means and the adder; a multiplier which multiplies the output of a means for obtaining signals by the output of the orthogonal function transformation means related to the first reading means; and inverse transformation means which subjects the output of the multiplier to an inverse orthogonal function transformation to produce a read image signal.

A further method of the present invention comprises reading a color original image using two or more first reading means having different spectral sensitivities and the same sampling interval and second reading means which has spectral sensitivity substantially the same as that of any one of said first reading means and which has a sampling interval different from that of said first reading means, and using the thus read signals from which undesirable signal components have been removed as read image signals.

A further apparatus of the present invention comprises first reading means of at least two systems for reading a color original image with different spectral sensitivities and the same sampling interval; second reading means having sensitivities substantially the same as that of any one system of the first reading means and having a sampling interval different from that of the first reading means; A/D converters which convert outputs of the first and second reading means into digital data, respectively; transformation means which subject outputs of the A/D converters to an orthogonal function transformation; means which compares absolute values concerning outputs of one system of the first reading means and of the second reading means for each of the components of the orthogonal function transformation means, which produces a smaller one as an output signal; and which removes undesirable signal components using a moire-removing space frequency filter for the outputs of systems other than the one system of the first reading means; and inverse transformation means which subjects the output of the means to an inverse orthogonal function transformation to produce a read image signal.

According to the present invention as described above, the original image or the color original image is read by at least two reading means which have different spectral sensitivities but which have the same sampling interval, and/or by reading means which has spectral sensitivity over the whole visible range or which has the same spectral sensitivity as that of any one of said reading means but which has a different sampling interval from that of said reading means, and undesirable signal components are removed by using the thus read signals.

According to the present invention, the original image is read with at least two different sampling intervals using reading means, the Fourier-transformed data is compared for each space frequency, and the data having a smaller absolute value is selected to remove moire components. Thus, the present invention is a method and apparatus for reading image, that are capable of reproducing image maintaining high quality, and presenting great practical advantage.

Other objects and features of the invention will become obvious from the following description taken in conjunction with the accompanying drawings.

BRIEF DESCRIPTION OF THE DRAWINGS

FIG. 6 is a block diagram which illustrates an apparatus according to the embodiment of the present invention;

FIG. 14 is a flow chart explaining the method according to a further embodiment of the present invention;

FIGS. 15A to 15D are diagrams explaining the further embodiment;

FIG. 18 is a flow chart explaining the method according to another embodiment of the present invention;

FIG. 20 is a flow chart illustrating the apparatus according to a further embodiment of the present invention;

FIGS. 21A to 21D and 22A to 22C are diagrams explaining the method of the present invention;

FIG. 23 is a block diagram which illustrates an apparatus according to a further embodiment of the present invention; and FIG. 24 is a diagram explaining the optical reading system used therein.

DESCRIPTION OF THE PREFERRED EMBODIMENTS

Figure 1:
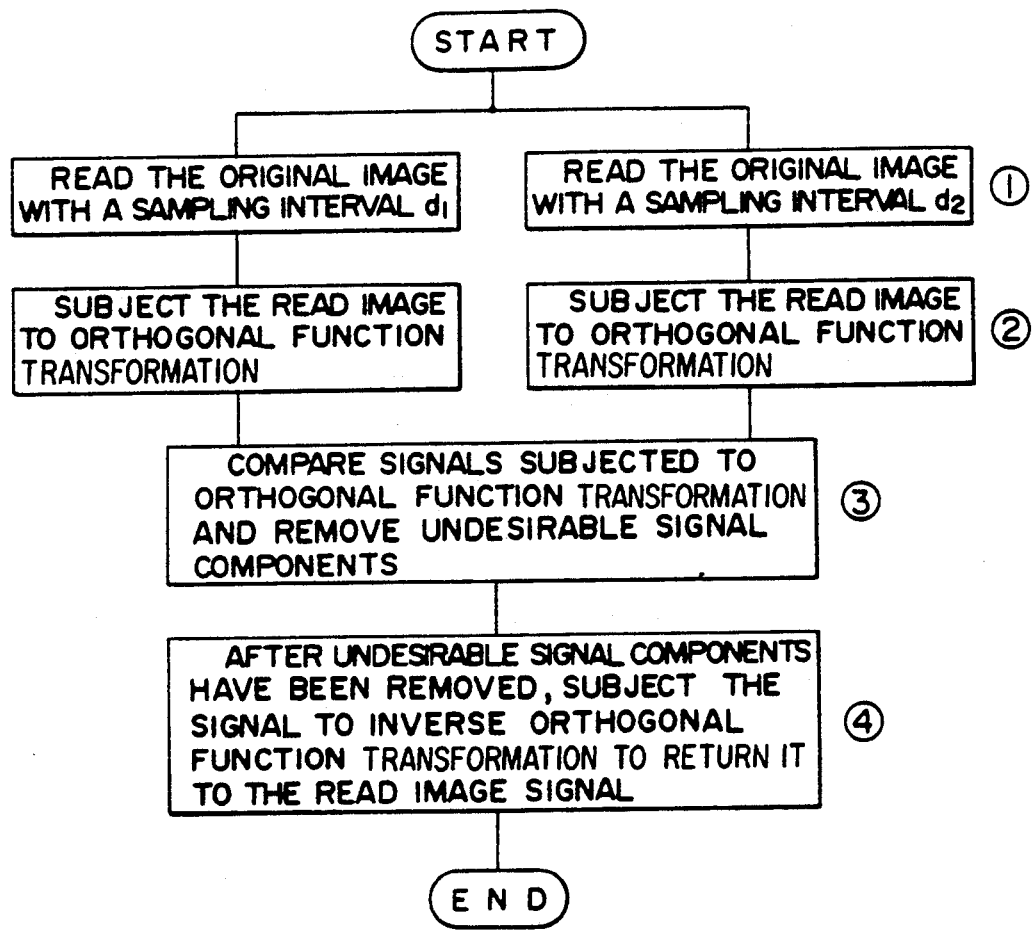
FIG. 1 is a flow chart illustrating a method according to an embodiment of the present invention.

FIG. 1 is a flow chart which illustrates a method according to an embodiment of the present invention. The invention will now be explained in detail in conjunction with this flow chart.

According to the present invention, the signal in practice is processed in the two-dimensional directions. For easy comprehension, however, the signal in the following description is treated in one-dimensional direction only.

Figure 2A:
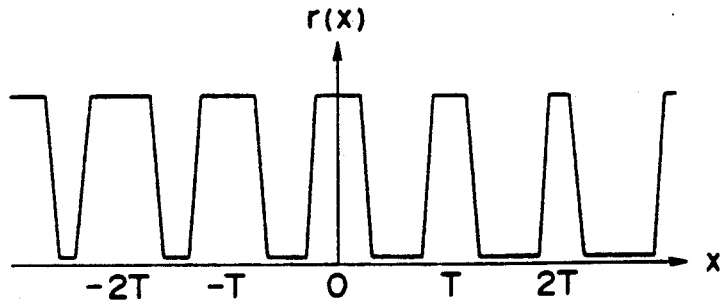
FIGS. 2A and 2B, 3A to 3D, 4A to 4D and 5A to 5E are diagrams explaining the method of the present invention.

FIG. 2A is a diagram in which a halftone dot image is scanned to find a reflective index, wherein the abscissa represents the distance and the ordinate represents the reflective index r(x) In the case of the halftone dot image, the reflective index r(x) becomes discrete as shown in FIG. 2A where T denotes a period of halftone dot image. Here, to examine by which frequency components the image signal is constituted serves as an important means for processing and analyzing the signals. To examine the frequency components, a so-called orthogonal function conversion is employed. Here, the conversion of the form of $$X = A(M) \cdot X \cdot A(N)^t$$

by a unitary matrix (matrix of which an inverse matrix is equal to a transposed matrix) A(M), A(N) for an image X of the size of M×N picture elements, is called two-dimensional orthogonal transformation. The orthogonal transformation has a feature in that energy distribution is concentrated on the low-frequency components due to the result of transformation, and edge and line data are reflected upon the high-frequency components. The orthogonal transformation is utilized when the features are to be picked up from the image In the case of the orthogonal conversion, in general, discrete Fourier transforms are also treated: the orthogonal transformation is often represented by a discrete Fourier transform.

Figure 2B:
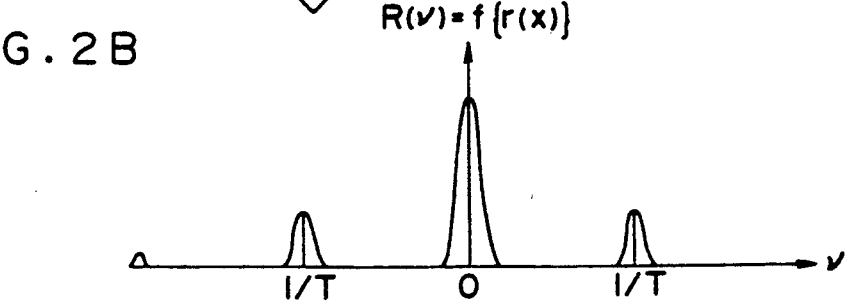

When a two-dimensional image is given, for example, it is often examined by which frequency (space frequency) components it is constituted Fourier transform is effected for the halftone dot image r(x) shown in FIG. 2A, and FIG. 2B shows the image by the plane of space frequency, wherein the abscissa represents the space frequency $\nu$ and the ordinate represents the result R($\nu$) of Fourier transform which is given by the following equation, $$R(\nu) = f[r(x)] \qquad (1)$$

where f represents Fourier transform.

Step 1

The original image is read with at least two different sampling intervals.

Figure 3A:
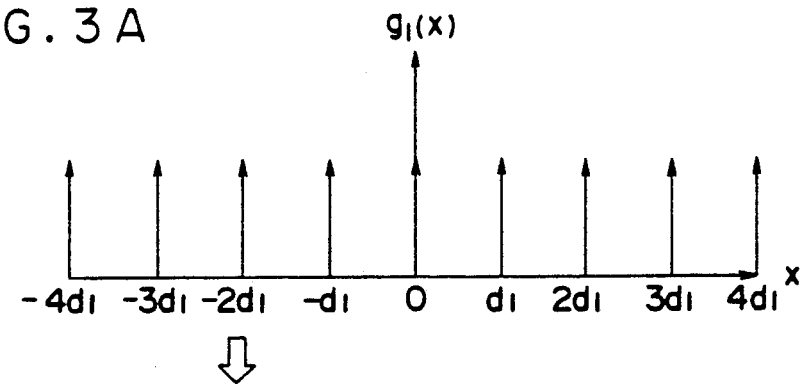
Figure 4A:
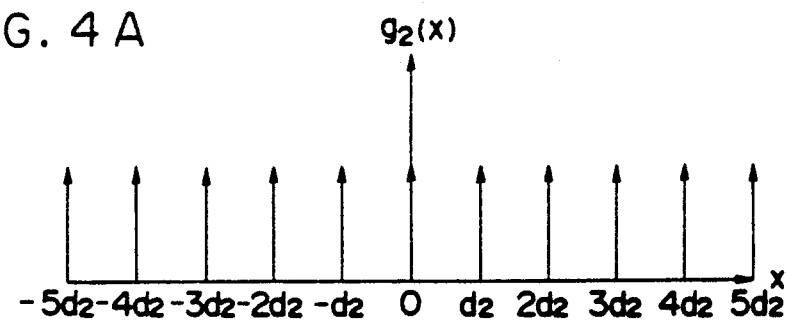

FIG. 3A is a diagram showing a function $g_1(x)$ of sampling interval $d_1$ by a first image sensor, and FIG. 4A is a diagram showing a function $g_2(x)$ of sampling interval $d_2$ by a second image sensor. Thus, the same original image is sampled with two different sampling intervals $d_1$ and $d_2$ to read image data. Means for reading the image data consists of, for example, the aforementioned line image sensor.

Step 2

Subject the read image to the orthogonal function transformation.

Figure 3B:
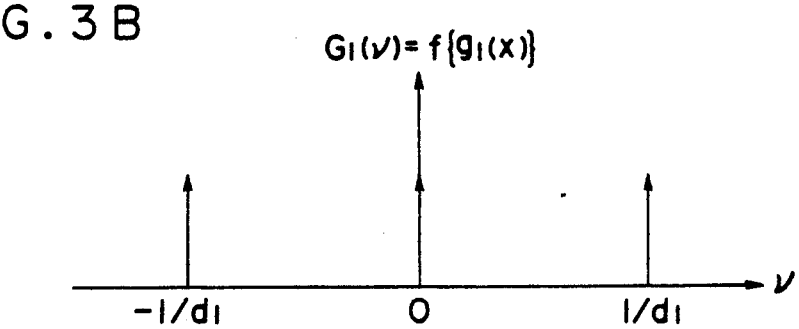

The sampling function $g_1(x)$ shown in FIG. 3A is subjected to Fourier transform and is indicated on the plane of space frequency to obtain a Fourier-transformed image $G_1(\nu)$ shown in FIG. 3B. Here, the Fourier-transformed image $G_1(\nu)$ is given by the following equation, $$G_1(\nu) = f[g_1(x)] \qquad (2)$$

Figure 3C:
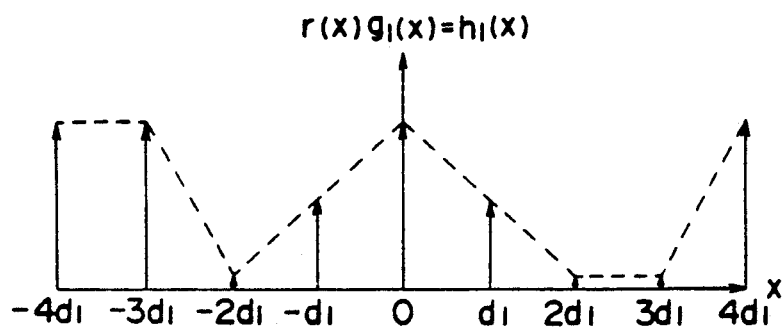

FIG. 3C shows an image obtained by sampling the halftone dot image r(x) of FIG. 2A with the sampling function $g_1(x)$ of FIG. 3A. The sampled image $h_1(x)$ is given by the following equation, $$h_1(x) = r(x) \cdot g_1(x) \qquad (3)$$

Figure 3D:
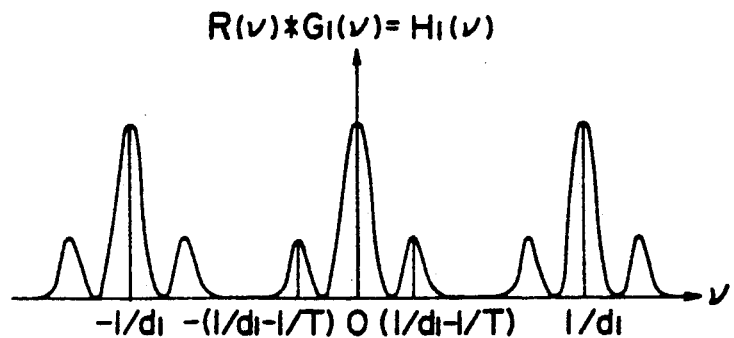

If the image $h_1(x)$ sampled according to the equation (3) is Fourier-transformed and is indicated on the plane of space frequency, the Fourier transformed formed image $H_1(\nu)$ becomes as shown in FIG. 3D, where $H_1(\nu)$ is given by, $$H_1(\nu) = \int_{-\infty}^{\infty} R(\nu') \cdot G_1(\nu - \nu')d\nu' = R(\nu) * G_1(\nu) \qquad (4)$$

where symbol "*" represents a convolution operation.

Figure 4B:
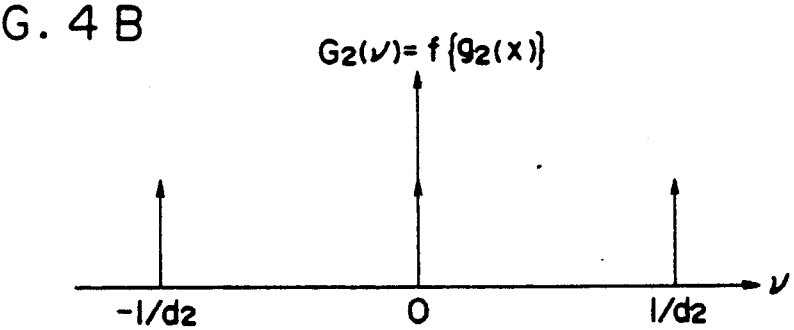

The same processing is effected even for FIGS. 4A to 4D. If the sampling function $g_2(x)$ shown in FIG. 4A is Fourier-transformed, there is obtained a Fourier-transformed image $G_2(\nu)$ in the region of space frequency $\nu$ as shown in FIG. 4B, where $G_2(\nu)$ is given by the following equation, $$G_2(\nu) = F[g_2(x)] \qquad (5)$$

Figure 4C:
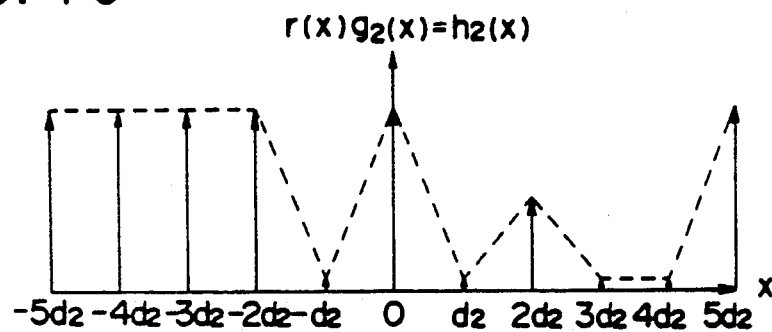

Then, the halftone dot image r(x) shown in FIG. 2A is sampled with the sampling function $g_2(x)$ of FIG. 4A to obtain a sampled image $h_2(x)$ as shown in FIG. 4C. The sampled image $h_2(x)$ is given by the following equation, $$h_2(x) = r(x) \cdot g_2(x) \qquad (6)$$

Figure 4D:
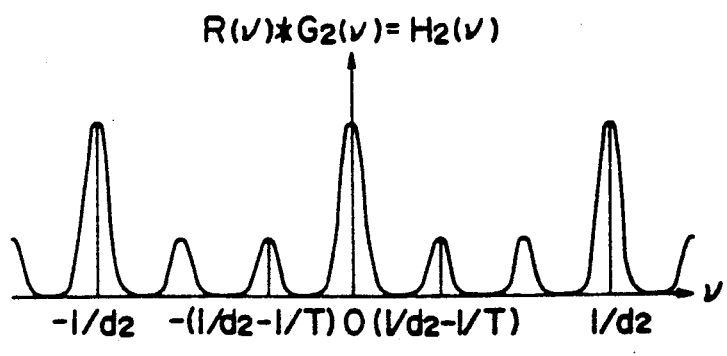

Next, the sampled image given by the equation (6) is Fourier-transformed and is indicated on the plane of space frequency ($\nu$). The Fourier-transformed image $H_2(\nu)$ becomes as shown in FIG. 4D. Here, $H_2(\nu)$ is given by the following equation, $$H_2(\nu) = \int_{-\infty}^{\infty} R(\nu') \cdot G_2(\nu - \nu')d\nu' = R(\nu) * G_2(\nu) \qquad (7)$$

Figure 5A:
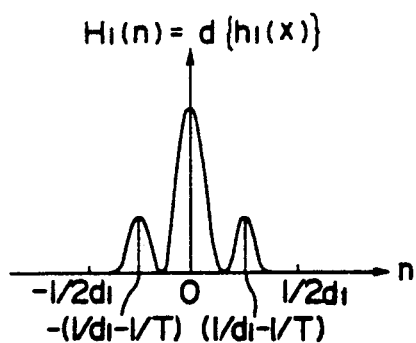
Figure 5B:
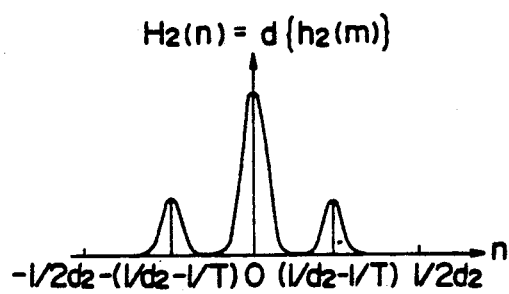

The Fourier transform mentioned in the foregoing is a continuous Fourier transform. In practice, the signals are processed in a discrete manner. If the sampled images $h_1(x)$ and $h_2(x)$ shown in FIGS. 3C and 4C are Fourier-transformed in a discrete manner, there are obtained Fourier-transformed images $H_1(n)$ and $H_2(n)$ as shown in FIGS. 5A and 5B, where the abscissa n denotes discrete space frequency. The Fourier-transformed images $H_1(n)$ and $H_2(n)$ are given by the following equations, $$H_1(n) = d[h_1(x)] \qquad (8)$$

$$H_2(n) = d[h_2(x)] \qquad (9)$$

where symbol "d" represents discrete Fourier transform.

Step 3

Signals subjected to the orthogonal function transformation are compared to remove undesirable signal components.

As will be obvious from the comparison of waveforms shown in FIGS. 5A and 5B, there are two small peaks that indicate moire on both sides of a peak of which the center has zero frequency. Positions of these peaks are different between FIG. 5A and FIG. 5B. What is to be obtained here is a signal consisting only of a peak having zero frequency as a center thereof but without small peaks on both sides thereof. It may be considered that the waveforms shown in FIGS. 5A and 5B are permitted to pass through a low-pass filter to remove small peaks on both sides thereof. In fact, however, since the original image contains frequency components at the positions of small peaks on both sides, it is difficult to faithfully reproduce the original signals.

In the present invention, therefore, absolute values of the two discrete Fourier-transformed images $H_1(n)$ and $H_2(n)$ are compared, and the smaller one is described for each space frequency to obtain a new discrete Fourier-transformed image $H(n)$ which is given by the following equation, $$H(n) = cmin\,[H_1(n), H_2(n)] \qquad (10)$$

where cmin[ ] denotes a function that assumes a complex absolute value of smaller one.

Figure 5C:
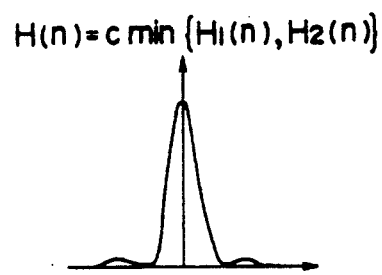

FIG. 5C is a diagram showing the waveform of $H(n)$. It will be recognized that small peaks on both sides are nearly completely removed.

Step 4

After undesirable signal components are removed, the signals are subjected to the inverse orthogonal function transformation to return them to the read image signals.

Figure 5D:
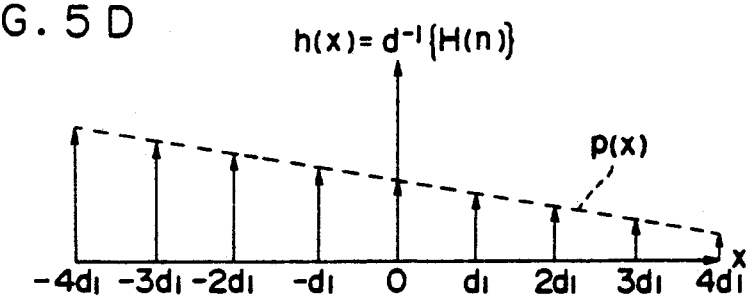

The signal $H(n)$ after undesirable signal components are removed shown in FIG. 5C is subjected to the discrete inverse Fourier transform to obtain an image signal $h(x)$ without moire as shown in FIG. 5D. Here, $h(x)$ is given by the following equation, and $p(x)$ is a function obtained by interpolating $h(x)$.

$$h(x) = d^{-1}[H(n)] \qquad (11)$$

Figure 5E:
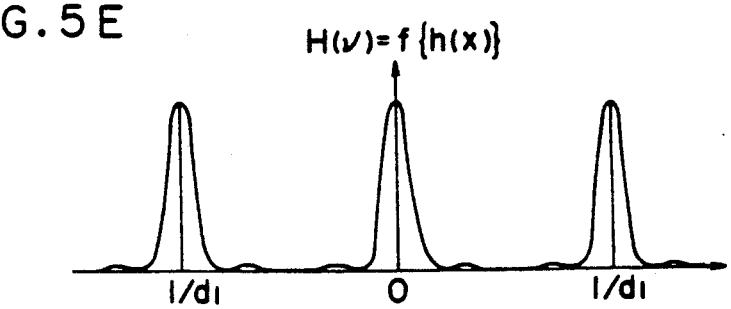

An image shown in FIG. 5E is obtained by subjecting the image signal $h(x)$ shown in FIG. 5D to Fourier transform, and wherein a waveform without moire shown in FIG. 5C is repeated at $1/d_1$.

Figure 7:
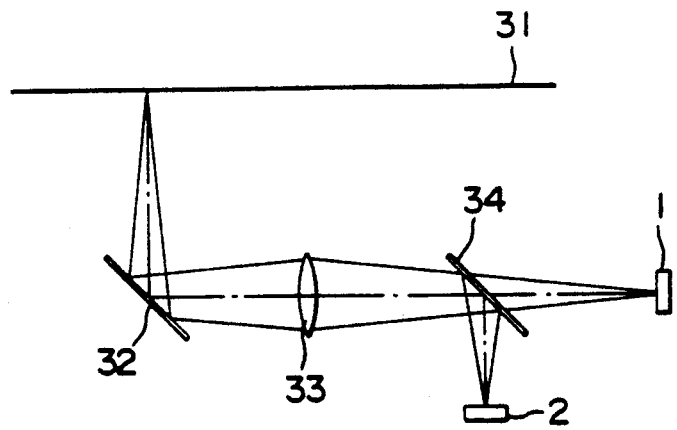
FIG. 7 is a diagram illustrating the structure of an optical reading system.

FIG. 6 is a block diagram illustrating an apparatus according to an embodiment of the present invention, wherein reference numerals 1 and 2 denote first and second image sensors that receive image input. The original image is input to the image sensors 1 and 2 via an optical reading system shown, for example, in FIG. 7. Optical image data from the original 31 enters into a half-mirror 34 through a mirror 32 and a lens 33, and is divided into two; i.e., the transmitted light enters into the first image sensor 1 and the reflected light enters into the second image sensor 2.

As mentioned earlier, the image sensors 1 and 2 must have different sampling intervals. For this purpose, the sensor elements (photoelectric converter elements) are mounted maintaining pitches $d_1$ and $d_2$. The image sensors 1 and 2 may perform the scanning using one-dimensional line image sensors, or may read the data at one time using two-dimensional image sensors. What is important here is that the sensor elements maintain different distances $d_1$ and $d_2$. In the case of the two-dimensional image sensor, the distance should preferably be different in both the vertical and lateral directions.

Further, the distance of one image sensor should not be an integer number of times that of the other image sensor. Moreover, the ratio of distance $d_1$ to distance $d_2$ between the two image sensors should range from 1 to 2, and should particularly preferably range from 1.1 to 1.8.

Output signals from the two image sensors 1, 2 are converted into digital data through A/D converters 3 and 4, and are stored in memories 5 and 6. The image data stored in the memories 5 and 6 are successively read out, subjected to discrete Fourier transform through discrete Fourier transform circuits 7 and 8, and are stored in memories 9 and 10. The sections of the two image sensors 1 and 2 in which the discrete Fourier transform is effected, should preferably be equal to each other on the image of the original. Therefore, the ratio of sample numbers of the image sensor 1 to the image sensor 2 should be $d_2$ to $d_1$ or, in other words, should be reverse to the ratio of pitch $d_1$ to pitch $d_2$.

The Fourier-transformed data stored in the memories 9 and 10 are successively read out, sent to absolute value circuits 11 and 12 to obtain absolute values thereof, and are compared by a comparator circuit 13 for each of space frequencies. The comparator circuit 13 sends, depending upon the result of comparison, a switching signal to a switch 14 so that the absolute value of the smaller one is selected. The switch 14 is switched to the side of the smaller absolute value between the Fourier-transformed data stored in the memories 9 and 10, selects the data having the smaller absolute value, and sends it to a memory 15 which successively stores the data of smaller absolute values thus selected.

The data stored in the memory 15 are successively read out, subjected to the inverse Fourier transform by a discrete inverse Fourier transform circuit 16, and are returned to the image read signals from which moire has been removed. The signal data returned to the image read signals by the discrete inverse Fourier transform circuit 16 are stored in a memory 17. The image read signal data stored in the memory 17 are read out, as required, displayed on a CRT or are printed out by a printer. The image thus produced and displayed features a high quality without moire.

Experimental results of the invention will now be described. A 100 lines/inch 45° halftone dot image was read over a region of two inches × two inches using a drum-type scanner having 100-$\mu$m apertures with two sampling intervals of 200 picture elements/inch and 150 picture elements/inch. There developed halftone dot-like fringe patterns of 42 lines/inch and 7 lines/inch that were not found in the original halftone dot image. The two read images (400 picture elements × 400 picture elements and 300 picture elements × 300 picture elements) were subjected to two-dimensional discrete Fourier transform using a computer. In the image of Fourier plane of 400 × 400, the low space frequency component (300 × 300) and image of Fourier plane of 300 × 300 were compared for each space frequency component to select components having smaller absolute values, in order to newly form an image of 300 × 300 Fourier plane. This image was subjected to the two-dimensional discrete inverse Fourier transform to obtain a good halftone dot image free of moire.

In the foregoing was described the case where the original image was read with two different sampling intervals. The original image, however, may be read with three or more sampling intervals. Further, the above description dealt with the case where the signals were processed one-dimensionally. However, the effect for removing moire can further be improved if the signals are processed according to the present invention in the two-dimensional directions. Furthermore, the above description has dealt with the case where the orthogonal function transformation was effected on a plane of Fourier transform. The present invention, however, is in no way limited thereto only but can be adapted to all of the transforms using orthogonal function. For instance, the invention can be adapted to Walsh-Hadamard transform and like transforms.

In the above description, furthermore, the operation was performed to select Fourier-transformed image having a smaller absolute value to remove moire. The invention, however, is in no way limited thereto only; i.e., any method may be employed provided it carries out the operation to remove peaks of moire. Moreover, the calculation time of the computer can be shortened if a high-speed algorithm such as FFT (fast Fourier transform) or WFTA (Winograd Fourier transform algorithm) is employed for the discrete Fourier transform/inverse transform.

According to another embodiment of the present invention, the original image is read with at least two different sampling intervals using first and second reading devices that are adjacent to each other.

Figure 8:
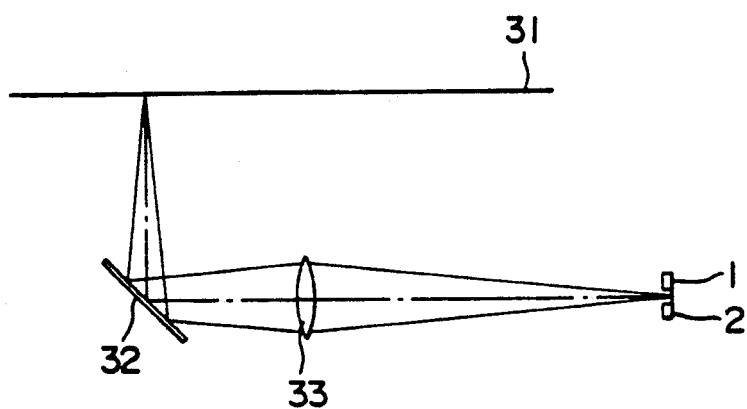
FIGS. 8 to 10 are diagrams illustrating optical reading systems according to further embodiments.

As shown in FIG. 8, for example, the data are input to the image sensors 1 and 2 via an optical reading system shown, for example, in FIG. 8. That is, the optical image data from the original 31 are input to the first image sensor 1 and to the second image sensor 2 adjacent to the first image sensor via a mirror 32 and a lens 33.

The description in regard to other portions is the same as that of the above-mentioned first embodiment.

Figure 9:
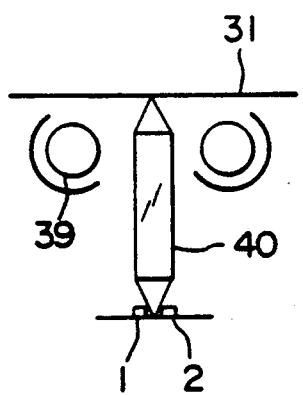

According to a further embodiment of the present invention as shown in FIG. 9, the original image is read with at least two different sampling intervals using intimately contacted-type reading means, and is input to the image sensors 1 and 2. That is, the light (optical image data) reflected by the original 31 that is irradiated by a light source 39 enters into the first image sensor 1 and the second image sensor 2 via a SELFOC lens array 40.

Figure 10:
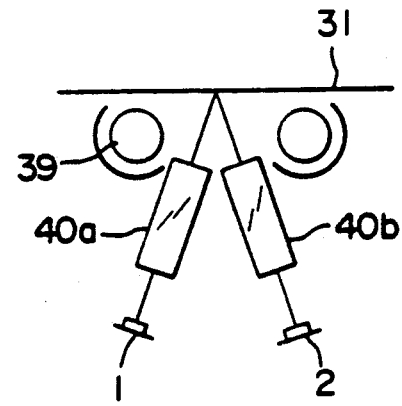

The intimately contacted-type optical reading system can be constituted in a variety of other ways in addition to the structure shown in FIG. 9. For example, SELFOC lens arrays 40a and 40b may be arranged for each of the image sensors 1 and 2 as shown in FIG. 10. Even in the case of this structure, the image sensors 1 and 2 have different sampling intervals as described earlier, as a matter of course.

Figure 11:
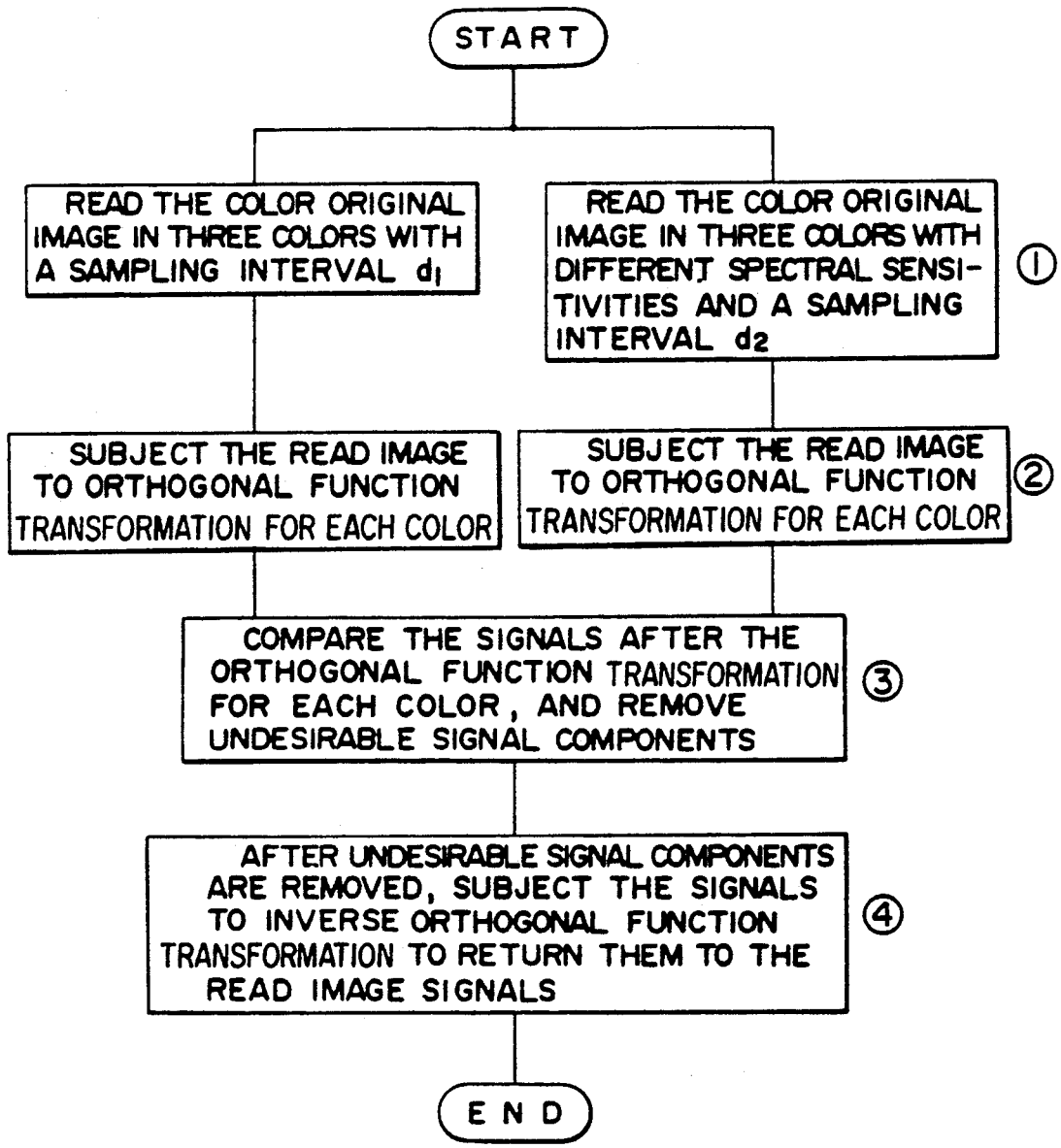
FIG. 11 is a flow chart explaining the method according to another embodiment of the present invention.

FIG. 11 is a flow chart of the method according to a further embodiment of the present invention. The invention will now be described in detail in conjunction with this flow chart.

According to this embodiment, the signals in practice are processed in the two-dimensional directions for each of the color channels such as red, green and blue. To simplify the description, however, the signals are processed one-dimensionally for one color channel in the same manner as described in connection with the above embodiment of FIGS. 2 to 5.

Figure 12:
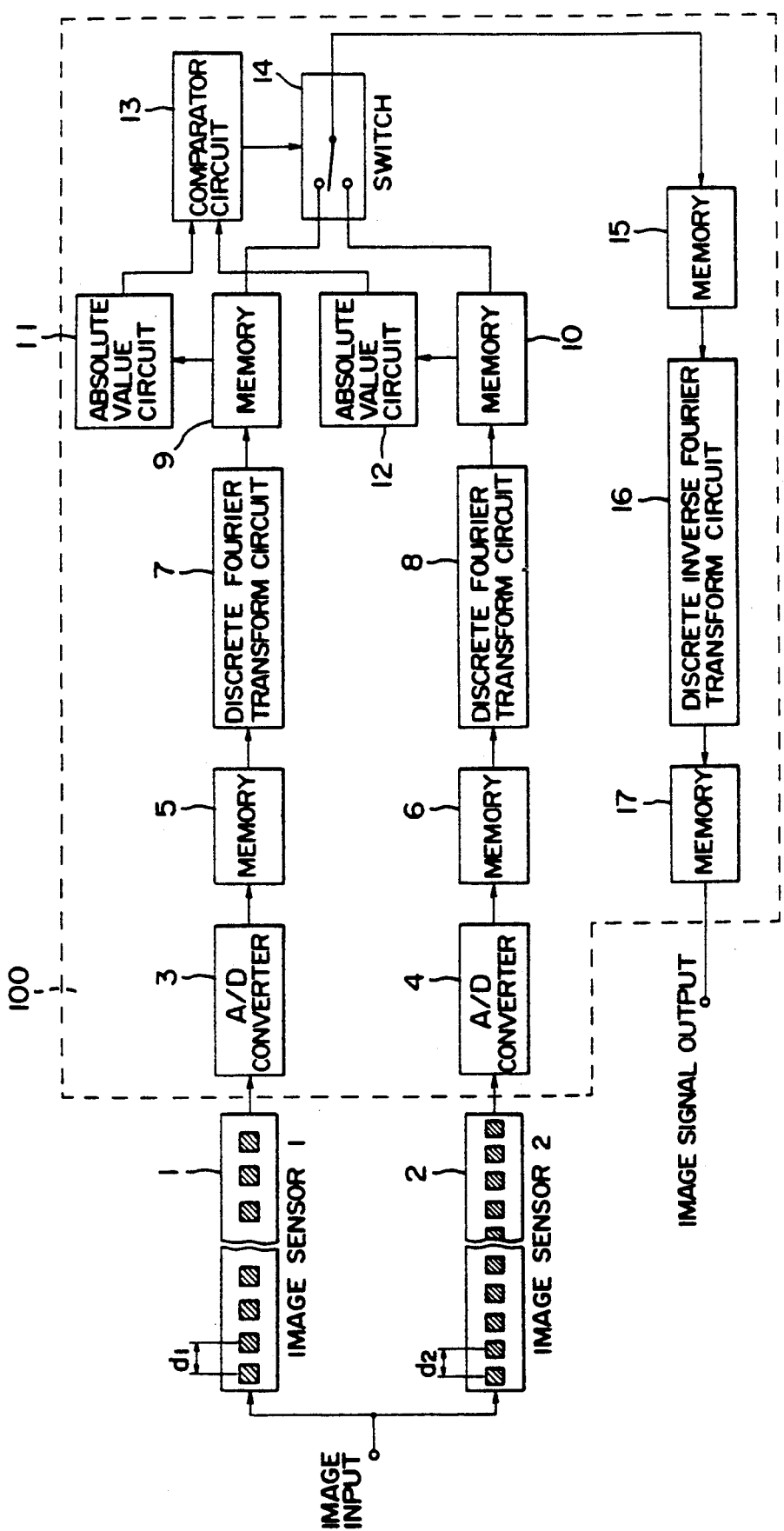
FIG. 12 is a block diagram illustrating the apparatus according to another embodiment of the present invention.
Figure 13:
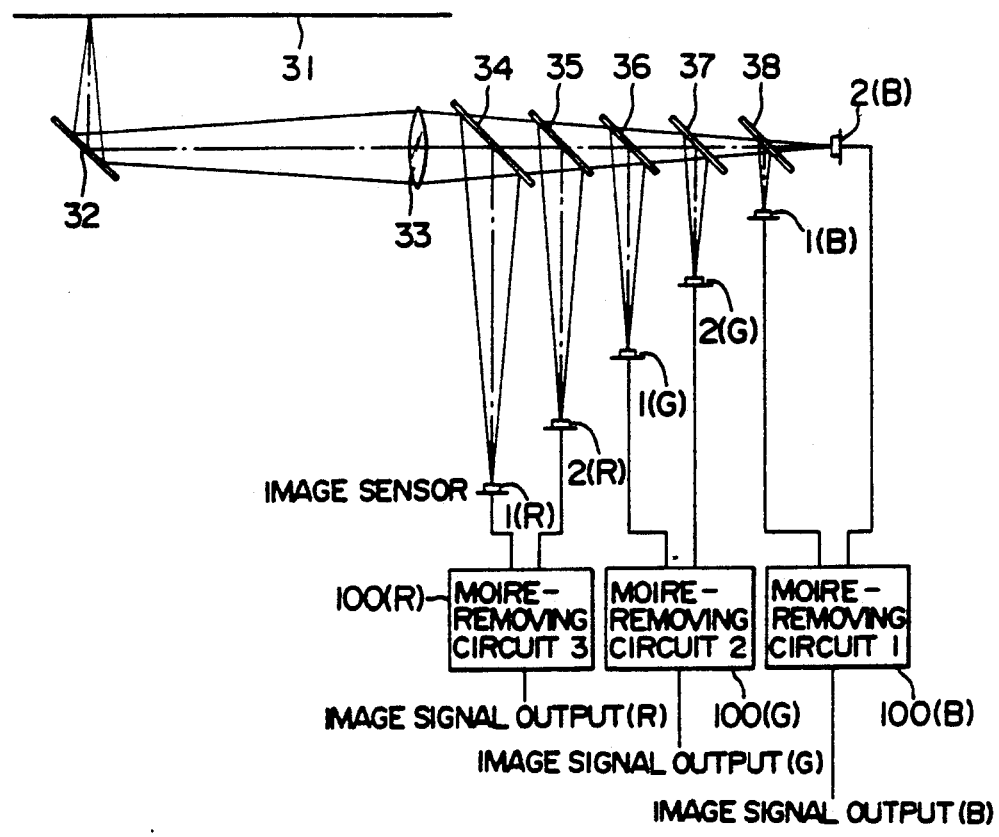
FIG. 13 is a diagram explaining the optical reading system used therein.

FIG. 12 is a block diagram illustrating major portions of this embodiment. In this embodiment, the image signals are obtained for each of the colors of red, green and blue. However, since the structure is the same for each of the colors, FIG. 12 illustrates the structure for one color only. When the structure corresponding to red, green or blue is to be concretely indicated in the following description, symbol R, G or B is written in parenthesis. In FIG. 12, reference numerals 1 and 2 denote first and second image sensors that receive image input and that have predetermined spectral sensitivities. Outputs of these image sensors 1 and 2 are input to a moire-removing circuit 100. The color original image is input to image sensors 1(R), 1(G), 1(B), 2(R), 2(G) and 2(B) through an optical reading system shown, for example, in FIG. 13. That is, the optical image data from the color original 31 enters into half-mirrors 34 to 38 via a mirror 32 and a lens 33, and is divided into six optical image data which are then allowed to enter into the first image sensors 1(R), 1(G), 1(B) and the second image sensors 2(R), 2(G), 2(B). Here, the half-mirrors 34 to 38 may be dichroic mirrors having spectral reflective index distributions.

The image sensors 1(R) and 2(R) have spectral sensitivity in red color, the image sensors 1(G) and 2(G) have spectral sensitivity in green color, and the image sensors 1(B) and 2(B) have spectral sensitivity in blue color. Further, the image sensors 1(R), 1(G), 1(B) and 2(R), 2(G) and 2(B) must have different sampling intervals as described earlier, and the sensor elements (photoelectric converter elements) are mounted maintaining pitches $d_1$ and $d_2$. The image sensors 1 and 2 may effect the scanning using one-dimensional line image sensors, or may read the data at one time using two-dimensional image sensors. What is important here is that the sensor elements maintain different distances $d_1$ and $d_2$. In the case of the two-dimensional image sensor, the distance should preferably be different in both the vertical and lateral directions. Further, the distance of one image sensor should not be an integer number of times that of the other image sensor. Moreover, the ratio of distance $d_1$ to distance $d_2$ between the two image sensors should range from 1 to 2, and should particularly preferably range from 1.1 to 1.8.

Output signals of the image sensors 1 and 2, i.e., output pairs of 1(R) and 2(R), 1(G) and 2(G), and 1(B) and 2(B), are processed by moire-removing circuits 100(R), 100(G) and 100(B). That is, output signals from the two image sensors 1 and 2 are converted into digital data by A/D converters 3 and 4 in the moire-removing circuit 100, and are stored in the memories 5 and 6.

The subsequent operation is the same as the one mentioned in the above embodiment.

FIG. 14 is a flow chart which illustrates a still further embodiment of the present invention. The invention will now be described in detail in conjunction with this flow chart.

The color image is read by image sensors of three colors that are sensitive to red light, green light and blue light. When a color halftone dot photograph used in the field of color printing is read by the image sensors of three colors, there develop undesirable fringes called color moire as mentioned earlier. In order to remove the moire according to the present invention, the moire is detected by an image sensor which has sensitivity over the whole visible range and which has a sampling interval different from those of the image sensors of the three colors. That is, output signals of the three color image sensors having a sampling interval $d_1$ are added up together to obtain white image signals of the sampling interval $d_1$. The white image signals are then compared with white image signals of the image sensor having the sampling interval $d_2$ to detect undesirable components. The signals in practice are processed in the two-dimensional directions. To simplify the description, however, the signals are processed one-dimensionally in the following description.

In this embodiment, the reflective index of FIG. 2A is denoted by W(x) which is given by, $$W(x) = r(x) + g(x) + b(x)$$

where
r(x): reflective index in red,
g(x) reflective index in green,
b(x): reflective index in blue.

The Fourier-transformed result is denoted by W(v) which is given by, $$W(v) = f[W(x)]$$

The sampled image $h_1(x)$ shown in FIG. 3C is denoted as $W_1(x)$ for white image, and given by the following equation, $$W_1(x) = W(x) \cdot m_1(x)$$
$$= r_1(x) + g_1(x) + b_1(x)$$

where
$r_1(x) = r(x) \cdot m_1(x)$
$g_1(x) = g(x) \cdot m_1(x)$
$b_1(x) = b(x) \cdot m_1(x)$ In this embodiment of the present invention, absolute values of the two discrete Fourier-transformed images $H_1(n)$ and $H_2(n)$ are compared with the same manner as the step 3 of the aforementioned embodiment, and the smaller one is selected, i.e., $$cmin[H_1(n), H_2(n)]$$

for each of the space frequencies, and is divided by $H_1(n)$ to obtain H(n) which is given by, $$H(n) = cmin[H_1(n), H_2(n)]/H_1(n)$$

where cmin[ ] represents a function which assumes a complex absolute value of the smaller one.

The thus obtained H(n) is used as a moire-removing space frequency filter.

FIG. 15A is a diagram showing the characteristics of H(n). Concerning the red color, for example, a sampled image $r_1(x)$ obtained by sampling the half-tone dot image r(x) with a sampling function $m_1(x)$, i.e., $$r_1(x) = r(x) \cdot m_1(x)$$

is subjected to the discrete Fourier transform, and the thus obtained Fourier-transformed image $R_1(n)$ (see FIG. 15B), i.e., $$R_1(n) = d[r_1(x)]$$
$$= R(n) * M_1(n)$$

is permitted to pass through the above-mentioned moire-removing space frequency filter H(n), thereby to obtain a signal $R_1'(n)$ (see FIG. 15C), i.e., $$R_1'(n) = R_1(n) \cdot H(n)$$

which is free of small peaks, i.e., free of undesirable signal components on both sides thereof.

The same quite holds true even for the green color and blue color.

That is, concerning the blue color, a sampled image $b_1(x)$ obtained by sampling with $d_1$, i.e., $$b_1(x) = b(x) \cdot m_1(x)$$

is subjected to the discrete Fourier transform to obtained a Fourier-transformed image $B_1(n)$, $$B_1(n) = d[b_1(x)]$$

which is then permitted to pass through a moire-removing space frequency filter H(n) to remove undesirable signal components, thereby to obtain a signal $B_1'(n)$, $$B_1'(n) = B_1(n) \cdot H(n)$$

Similarly, the discrete inverse Fourier transform is effected to obtain an image signal r'(x)(see FIG. 15D) free of moire and a signal b'(x), $$r'(x) = d^{-1}[R_1'(n)]$$

$$b'(x) = b^{-1}[B_1'(n)]$$

Figure 17:
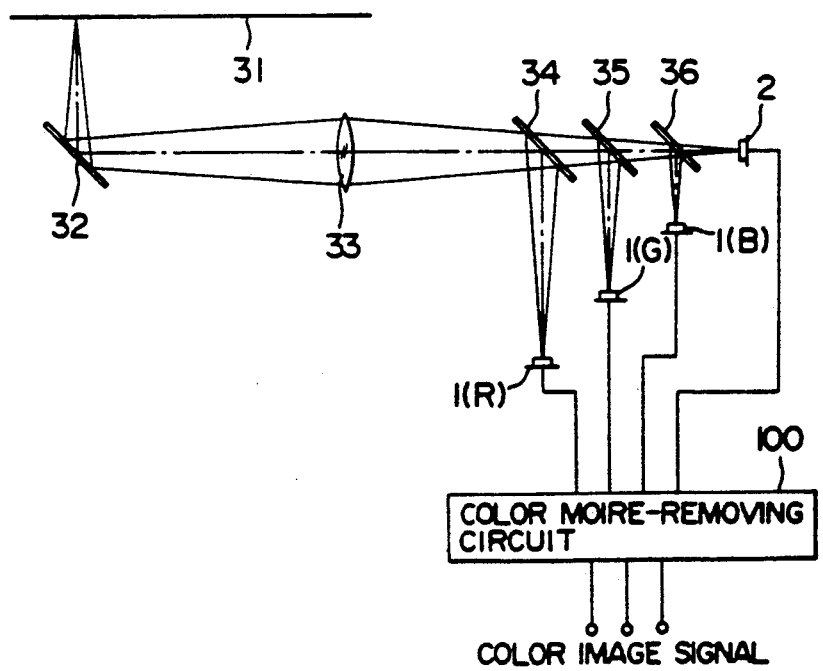
FIG. 17 is a diagram which explains the still further embodiment.
Figure 16:
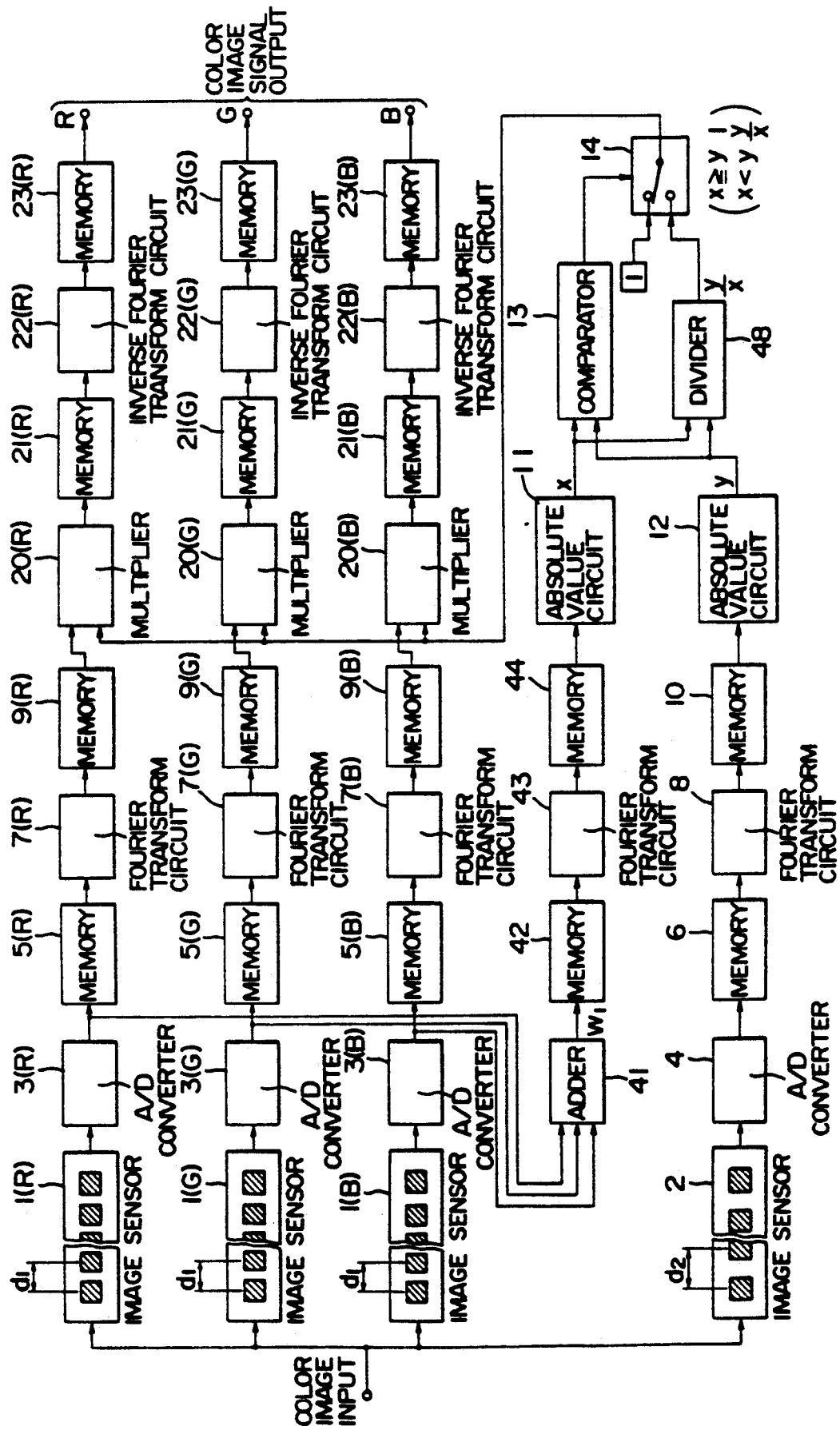
FIG. 16 is a diagram explaining the apparatus according to a still further embodiment of the present invention.

FIG. 16 is a block diagram which illustrates this embodiment, wherein reference numerals 1 and 2 denote first and second image sensors that receive image input, the first image sensor being comprised of sensors 1(R), 1(G) and 1(B) having spectral sensitivities in red, green and blue colors. The second image sensor 2 has a spectral sensitivity over the whole visible range. The color original image is input to the image sensors 1 and 2 via an optical reading system shown, for example, in FIG. 17. That is, the optical image data from the color original 31 enter into half-mirrors 34 to 36 via a mirror 32 and a lens 33, and are divided into four optical image data which then enter into the first image sensors 1(R), 1(G) and 1(B) and into the second image sensor 2. Outputs of the first and second image sensors are input to the color moire-removing circuit 100.

Output signals from the image sensors 1 and 2 are converted into digital data by A/D converters 3(R), 3(G), 3(B), and 4 and are stored in memories 5(R), 5(G), 5(B), and 6. The image data stored in the memories 5(R), 5(G), 5(B) and 6 are successively read out, subjected to discrete Fourier transform through discrete Fourier transform circuits 7(R), 7(G), 7(B) and 8, and are stored in memories 9(R), 9(G), 9(B) and 10. The sections for effecting the discrete Fourier transform of the two image sensors 1 and 2 should desirably be the same on the original image. Therefore, the ratio of sample numbers of the image sensor 1 to the image sensor 2 should be $d_2$ to $d_1$ or, in other words, should be reverse to the ratio of pitch $d_1$ to pitch $d_2$.

Outputs of the A/D converters 3(R), 3(G) and 3(B) are added up together by an adder 41, and the added data are stored in a memory 42. The thus stored image data are read out successively, subjected to the discrete Fourier transform through a discrete Fourier transform circuit 43, and are stored in a memory 44.

Fourier transformed data stored in the memories 10 and 44 are successively read out, and are input to absolute value circuits 12 and 11 to find absolute values y and x thereof. The absolute values are then compared by a comparator circuit 13 for each of the space frequencies. Further, outputs y and x of the absolute value circuits 12 and 11 are input to a divider circuit 48 which performs the operation y/x, and the result thereof is applied to either one of the contacts of a switch 14. A signal 1 has been applied to another contact of the switch 14. The comparator circuit 13 supplies a switching signal to the switch 14 such that the signal 1 is produced from the switch 14 when $x \geq y$ and that a signal y/x is produced therefrom when $x < y$. Multipliers 20(R), 20(G) and 20(B) work to multiply the data read out from the memories 9(R), 9(G) and 9(B) by the data obtained via the switch 14. Output data of these multipliers are stored in memories 21(R), 21(G) and 21(B).

The data stored in the memories 21(R), 21(G) and 21(B) are successively read out, subjected to the inverse Fourier transform through discrete inverse Fourier transform circuits 22(R), 22(G) and 22(B), and are returned to the read image signals which are free of moire. The signal data returned to the read image signals through the discrete inverse Fourier transform circuits 22(R), 22(G) and 22(B) are stored in memories 23(R), 23(G) and 23(B). The read image signal data stored in the memories 23(R), 23(G) and 23(B) are read out, as required, and are displayed on the CRT or are printed out by the printer. The image thus displayed features a high quality without moire.

According to another embodiment of the present invention, the moire is detected by an image sensor which is provided in addition to the above-mentioned image sensors and which has nearly the same sensitivity as that of any one of the red, green or blue image sensor, but which has a different sampling interval therefrom, in order to remove the moire. From the viewpoint of specific visibility of a man, this image sensor should have a spectral sensitivity in green color.

FIG. 18 is a flow chart of this embodiment.

Figure 19:
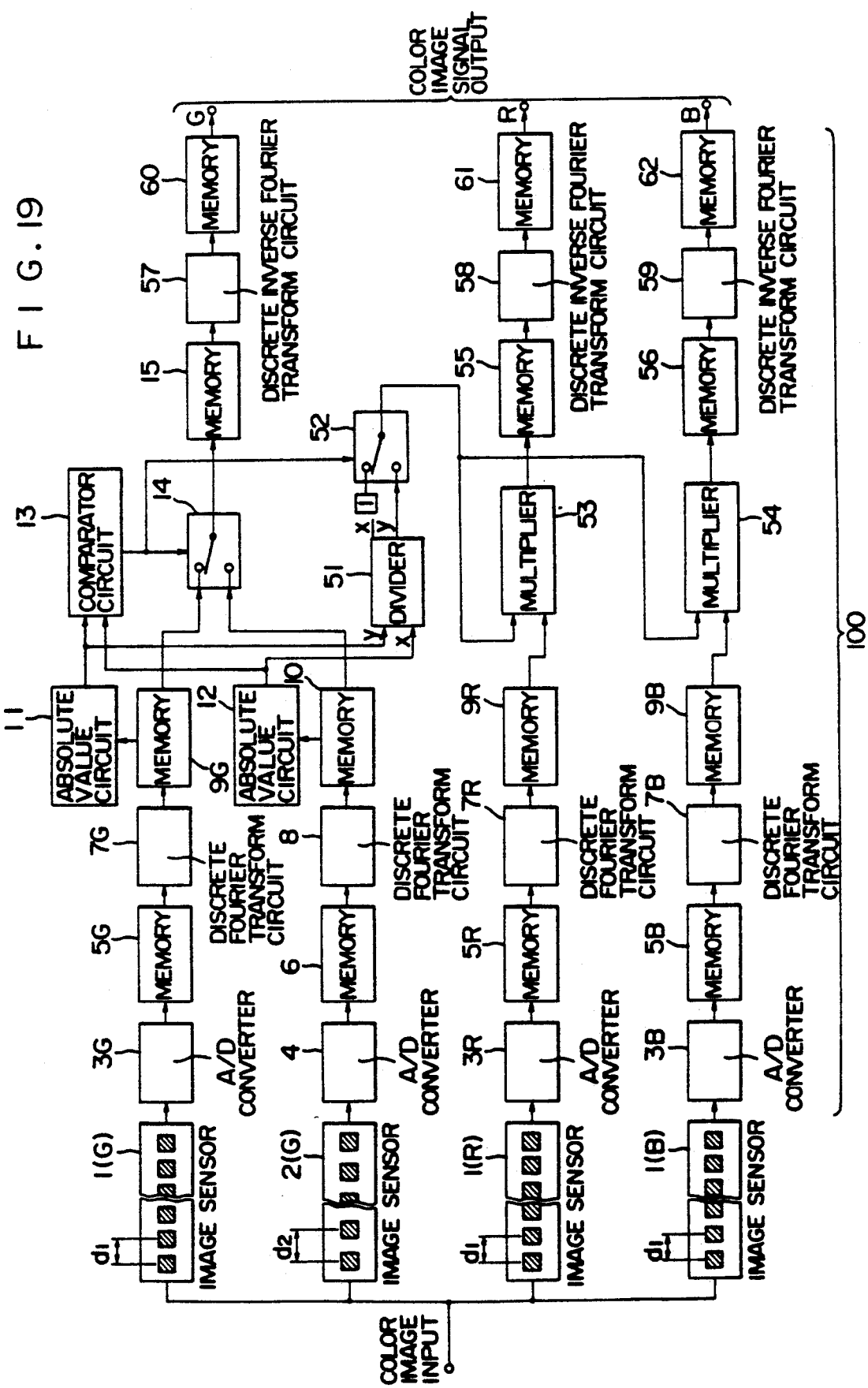
FIG. 19 is a block diagram illustrating the apparatus according to another embodiment of the present invention.

FIG. 19 is a block diagram which illustrates this embodiment. According to this embodiment, the second image sensor 2(G) has spectral sensitivity in green color.

Outputs y and x of absolute value circuits 11 and 12 are input to a divider 51 which carries out the operation x/y. Reference numeral 52 denotes another switch controlled by a comparator circuit 13. The output of the divider 51 is applied to one contact of the switch 52 which has another contact served with a signal 1. Concretely speaking, the switch 52 is controlled by the output of the comparator circuit 13, such that the signal 1 is selected when $x \geq y$ and that the signal x/y is selected when $x < y$.

Reference numerals 53 and 54 denote multipliers which receive outputs of memories 9R and 9B through input terminals of one side thereof, and which receive output of the switch 52 through input terminals of the other side thereof. The multiplied results are those which have passed through the above-mentioned moire-removing space frequency filter, and are stored in the memories 55 and 56.

The data stored in the memories 15, 55 and 56 are successively read out, subjected to the inverse Fourier transform through discrete inverse Fourier transform circuits 57 to 59, and are returned back to the read image signals which are free of moire. The signal data returned back to the read image signals through the discrete inverse Fourier transform circuits 57 to 59 are stored in memories 60 to 62. The read image signal data stored in the memories 60 to 62 are read out, as required, and are displayed on the CRT or are printed out by the printer. The image thus displayed features a high quality free of moire.

FIG. 20 is a flow chart illustrating a further embodiment of the present invention.

This embodiment contemplates that the moire of each of red, green and blue colors is removed and the number of the color image sensors is reduced.

According to this embodiment, a good color image having no moire of each color can be obtained with reduced cost.

This embodiment will now be explained.

In this embodiment, the moire is detected and removed by using image sensors of the three colors different in sampling interval from one another and an image sensor (called as white image sensor hereinafter) which has sensitivity over the whole visible range and which has a sampling interval different from those of the image sensors of the three colors. Specifically, an image signal for one color is obtained arithmetically from outputs of image sensors for the other two colors and the white image sensor, and the image signal thus obtained is compared with the image signal from the image sensor for said one color to detect undesirable signal components.

In this embodiment, the original image is read with different sampling intervals by four image sensors of different spectral sensitivities. Further, in this embodiment, the sampling intervals are set as $d_1$, $d_2$, $d_3$ and $d_4$, respectively and the sampling functions are set as $m_1(x)$, $m_2(x)$, $m_3(x)$ and $m_4(x)$, respectively, for red, green, blue and white colors. The reflexibilities of the halftone dot images are set as $r(x)$, $g(x)$, $b(x)$ and $w(x)$, respectively, and the output functions (sampling images) are set as $r_1(x)$, $g_2(x)$, $b_3(x)$ and $w_4(x)$, respectively, for red, green, blue and white colors.

Each of steps 1' to 4' of this embodiment will now be explained.

Steps 1' and 2' are carried out in the same manners as the steps 1 and 2 and accordingly the explanations are omitted.

Steps 3' and 4' will be explained.

Step 3'

Undesirable signal components are detected and removed by using orthogonally transformed signals.

If there is no moire, the following equation is given:

$$w_4(x) = r_1(x) + g_2(x) + b_3(x) \qquad (12)$$

It will be noted that if $$r'(x) = w_4(x) - g_2(x) - b_3(x) \qquad (13)$$

$$g'(x) = w_4(x) - r_1(x) - b_3(x) \qquad (14)$$

$$b'(x) = w_4(x) - r_1(x) - g_2(x) \qquad (15)$$

then $r'(x)$, $g'(x)$ and $b'(x)$ are the same as $r_1(x)$, $g_1(x)$ and $b_1(x)$, respectively. They are subjected to the Fourier transform as follows:

$$\begin{aligned}
&R'(\nu) \\
&= f\{r'(x)\} \\
&= W_4(\nu) - G_2(\nu) - B_3(\nu) \\
&G'(\nu) \\
&= f\{g'(x)\} \\
&= W_4(\nu) - R_1(\nu) - B_3(\nu) \\
&B'(\nu) \\
&= f\{b'(x)\}
\end{aligned}$$

$$= W_4(\nu) - R_1(\nu) - G_2(\nu)$$

$R_1(\nu)$ and $R'(\nu)$, $G_1(\nu)$ and $G'(\nu)$, and $B_1(\nu)$ and $B'(\nu)$ are compared with each other for each space frequency and the ones smaller in absolute value are taken, so that the undesirable signal components can be removed as follows:

$$R''(\nu) = cmin\{R_1(\nu), R'(\nu)\} \quad (16)$$

$$G''(\nu) = cmin\{G_1(\nu), G'(\nu)\} \quad (17)$$

$$B''(\nu) = cmin\{B_1(\nu), B'(\nu)\} \quad (18)$$

where cmin { } denotes a function that assumes a complex absolute value of smaller one. However, the actual operation is carried out discretely and accordingly the following equations are obtained.

$$R'(n) = W_4(n) - G_2(n) - B_3(n) \quad (19)$$

$$G'(n) = W_4(n) - R_1(n) - B_3(n) \quad (20)$$

$$B'(n) = W_4(n) - R_1(n) - G_2(n) \quad (21)$$

and then $R_1(n)$ and $R'(n)$, $G_1(n)$ and $G'(n)$, and $B_1(n)$ and $B'(n)$ are compared with each other for each space frequency and the ones smaller in absolute value are taken.

Specifically, the undesirable signal components can be removed by obtaining $R''(n)$, $G''(n)$ and $B''(n)$ shown in following equations:

$$R''(n) = cmin\{R_1(n), R'(n)\} \quad (22)$$

$$G''(n) = cmin\{G_1(n), G'(n)\} \quad (23)$$

$$B''(n) = cmin\{B_1(n), B'(n)\} \quad (24)$$

The fact that the undesirable signal components can be removed by the above processing will be explained with reference to red color.

As will be obvious from the waveforms shown in FIGS. 21A and 22A, the absolute values of $R_1(n)$ and $R'(n)$ have two small peaks that indicate moire on both sides of a peak of which the center has zero frequency. Positions of these peaks are different between FIG. 21A and FIG. 22A. What is to be obtained here is a signal consisting only of a peak having zero frequency as a center thereof but without small peaks on both sides thereof. It may be considered that the waveforms shown in FIGS. 21A and 22A are permitted to pass through a low-pass filter to remove small peaks on both sides thereof. In fact, however, since the original image contains frequency components at the positions of small peaks on both sides, it is difficult to faithfully reproduce the original signals.

In the present invention, therefore, a signal having no small peaks, that is, no undesirable signal components on both sides thereof is obtained by processing the equations (22) to (24). FIG. 22B shows an absolute value of the signal $R''(n)$ for red color, which can be applied to the cases of green and blue colors, similarly.

Step 4′

After undesirable signal components are removed, the signals are subjected to the inverse orthogonal function transformation to return them to the read image signals.

The signal $R''(n)$ after undesirable signal components are removed shown in FIG. 22B is subjected to the discrete inverse Fourier transform to obtain an image signal $r''(x)$ without moire as shown in FIG. 22C. Here, $r''(x)$ is given by the following equation.

$$r''(x) = d^{-1}[R''(n)] \quad (25)$$

Similarly, image signals $g''(x)$ and $b''(x)$ having no moire can be obtained for green and blue colors as follows:

$$g''(x) = d^{-1}\{G''(n)\} \quad (26)$$

$$b''(x) = d^{-1}\{B''(n)\} \quad (27)$$

FIG. 23 is a block diagram illustrating an apparatus according to a further embodiment of the present invention, wherein reference numerals 1′(R), 1′(G), 1′(B) and 1′(W) denote image sensors for reading images. Said image sensors have sensitivity over the whole visible range and red, green and blue colors, respectively, and sampling intervals different from one another. The color original image is applied to the image sensors 1′(R), 1′(G), 1′(B) and 1′(W) via an optical reading system shown, for example, in FIG. 24. Optical image data from the color original 31 enters into half-mirrors 34 to 36 through a mirror 32 and a lens 33, and is divided into four; i.e., the transmitted light enters into the image sensors 1′(R), 1′(G), 1′(B) and 1′(W). The output of each image sensor is applied to a color moire-removing circuit 100.

As mentioned earlier, the image sensors 1′(R), 1′(G), 1′(B) and 1′(W) have different sampling intervals, so that the sensor elements (photoelectric converter elements) are mounted maintaining pitches $d_1$, $d_2$, $d_3$, $d_4$, respectively. The image sensors 1′(R), 1′(G), 1′(B) and 1′(W) may perform the scanning using one-dimensional line image sensors, or may read the data at one time using two-dimensional image sensors. What is important here is that the sensor elements maintain different distances $d_1$ to $d_4$, respectively. In the case of the two-dimensional image sensors, the distance should preferably be different in both the vertical and lateral directions.

What is claimed is:

1. A method of reading an original image comprising:
   reading the original image with at least two different sampling intervals to produce first read image signals;
   subjecting said first read image signals to an orthogonal function transformation to produce image signals on a plane of orthogonal function transformations;
   comparing said image signals on the plane of orthogonal function transformation to remove undesirable signal components from said image signals on the plane of orthogonal function transformation and to produce an output signal on the plane of orthogonal function transformation wherein among said image signals on the plane of orthogonal function transformation frequency components having smaller absolute values are selected; and
   subjecting said output signal to an inverse orthogonal function transformation to produce a second read image signal.

2. An apparatus for reading an original image comprising:

reading means having at least two image sensors and having at least two different sampling intervals for reading an original image to produce first read image signals;

means for subjecting said first read image signals to an orthogonal function transformation to produce image signals on a plane of orthogonal function transformations;

means for comparing said image signals on the plane of orthogonal transformation to remove undesirable signal components from said image signals on the plane of orthogonal function transformation and to produce an output signal wherein among said image signals on the plane of orthogonal function transformation frequency components having smaller absolute values are selected; and means for subjecting said output signal to an inverse orthogonal function transformation to produce a second read image signal.

3. A method of reading a color image comprising:

reading a color original image with at least two different spectral sensitivities and two different sampling intervals to produce first and second image signals;

subjecting said read image signals to an orthogonal function transformation to produce image signals on a plane of orthogonal function transformations;

comparing said image signals on the plane of orthogonal functional transformation to remove undesirable frequency components and to produce an output wherein among said image signals on the plane of orthogonal function transformation frequency components having smaller absolute values are selected; and subjecting said output to an inverse orthogonal function transformation to produce a second read image signal.

4. The method of claim 3, wherein the step of reading the color original image includes using at least two pairs of sensors, said pairs having different spectral sensitivities and the sensors of each one of said pairs having different sampling intervals.

5. The method of claim 3, wherein the step of reading the color original images includes using at least two sensors having different spectral sensitivities.

6. The method of claim 5, wherein at least three sensors are used, said sensors having different spectral sensitivities and two different sampling intervals.

7. An apparatus for reading a color image comprising:

reading means for reading the color image which comprises at least two sensors, said reading means having different spectral sensitivities and different sampling intervals to produce first read image signals;

means for subjecting said first image signals to an orthogonal function transformation to produce image signals on a plane of orthogonal function transformations;

means for comparing said image signals on the plane of orthogonal function transformation to remove undesirable frequency components from said image signals on the plane of orthogonal function transformation, wherein among said image signals on the plane of orthogonal function transformation frequency components having smaller absolute values are selected to produce an output on the plane of orthogonal function transformation; and means for subjecting said output on the plane of orthogonal function transformation to an inverse orthogonal function transformation to produce a second read image signal.

8. The apparatus of claim 7, wherein said reading means comprise at least two pairs of sensors, said pairs having different spectral sensitivities and said sensors of each one of said pairs having different sampling intervals.

9. The apparatus of claim 8, wherein at least three of said sensors are provided, said sensors having different spectral sensitivities and two different sampling intervals.

10. The apparatus of claim 7, wherein said sensors have different spectral sensitivities.

11. An apparatus for reading a color image comprising:

first reading means comprising at least two image sensors for reading the color image with different spectral sensitivities and with a common sampling interval and for producing first outputs;

second reading means comprising at least one image sensor having a spectral sensitivity over an entire visible range for reading the color image with a sampling interval different from that of said first reading means to produce second outputs;

an adder for adding the first outputs;

A/D converter means for converting said added first outputs and second outputs into digital data, respectively;

transformation means for subjecting the digital data of said A/D converter means to an orthogonal function transformation and for producing orthogonally transformed outputs;

means for diminishing frequency components of said orthogonally transformed outputs, said frequency components varying in accordance with the difference between said sampling intervals of said first and second reading means, and for producing diminished frequency component outputs; and inverse transformation means for subjecting the diminished frequency components outputs to an inverse orthogonal function transformation to produce a read image signal.

12. An apparatus for reading the color image comprising:

first reading means comprising at least two image sensors for reading the color image with different spectral sensitivities and a common sampling interval and for producing a first output;

second reading means having a common sensitivity as that of any image sensor of said first reading means and for reading the color image with a sampling interval different from that of said first reading means and for producing a second output;

A/D converter means for converting the first and second outputs into digital data, respectively;

transformation means for subjecting the digital data of the A/D converter means to an orthogonal function transformation and for producing orthogonally transformed outputs;

means for comparing the orthogonally transformed outputs by comparing the outputs of one image sensor of said first reading means and the output of said second image sensor, and for removing undesirable signal components wherein frequency components varying in accordance with the difference of the sampling intervals of said first and second reading means are diminished; and inverse transformation means for subjecting the output of said comparing and removing means to an inverse orthogonal function transformation to produce a read image signal.

* * * * *